(12) United States Patent
Martins Loureiro et al.

(10) Patent No.: US 7,700,003 B2
(45) Date of Patent: Apr. 20, 2010

(54) COMPOSITION, ARTICLE, AND METHOD

(75) Inventors: Sergio Paulo Martins Loureiro, Saratoga Springs, NY (US); Alok Mani Srivastava, Niskayuna, NY (US); Kevin Paul McEvoy, Ballston Spa, NY (US); Venkat Subramaniam Venkataramani, Clifton Park, NY (US); Steven Jude Duclos, Clifton Park, NY (US); James Scott Vartuli, Rexford, NY (US); Carl Joshua Vess, Latham, NY (US)

(73) Assignee: General Electric Company, Niskayuna, NY (US)

( * ) Notice: Subject to any disclaimer, the term of this patent is extended or adjusted under 35 U.S.C. 154(b) by 309 days.

(21) Appl. No.: 11/668,900

(22) Filed: Jan. 30, 2007

(65) Prior Publication Data
US 2007/0267576 A1 Nov. 22, 2007

Related U.S. Application Data

(63) Continuation-in-part of application No. 11/427,191, filed on Jun. 28, 2006, now Pat. No. 7,368,719, and a continuation-in-part of application No. 11/095,233, filed on Mar. 30, 2005, now abandoned.

(60) Provisional application No. 60/763,249, filed on Jan. 30, 2006, provisional application No. 60/882,035, filed on Dec. 27, 2006.

(51) Int. Cl.
C09K 11/66 (2006.01)
G01T 1/20 (2006.01)
(52) U.S. Cl. .................... 252/301.4 H; 250/361 R
(58) Field of Classification Search ............. 250/361 R, 250/362, 367; 252/301.4 H
See application file for complete search history.

(56) References Cited

U.S. PATENT DOCUMENTS

| | | | |
|---|---|---|---|
| 4,522,865 A * | 6/1985 | Packer | ..................... 428/212 |
| 5,134,293 A | 7/1992 | Anderson et al. | |
| 5,213,712 A | 5/1993 | Dole | |
| 5,869,836 A | 2/1999 | Linden et al. | |
| 5,882,547 A | 3/1999 | Lynch et al. | |
| 6,093,347 A | 7/2000 | Lynch et al. | |
| 6,252,232 B1 | 6/2001 | McDaniel et al. | |
| 6,302,959 B2 | 10/2001 | Srivastava et al. | |
| 6,437,336 B1 | 8/2002 | Pauwels et al. | |
| 6,583,434 B2 | 6/2003 | Struye et al. | |
| 6,585,913 B2 | 7/2003 | Lyons et al. | |
| 6,624,420 B1 | 9/2003 | Chai et al. | |
| 6,624,422 B2 | 9/2003 | Williams et al. | |
| 7,084,403 B2 | 8/2006 | Srivastava et al. | |
| 2001/0053017 A1 | 12/2001 | Oyama | |
| 2005/0082484 A1 | 4/2005 | Srivastava et al. | |
| 2006/0104880 A1 | 5/2006 | Iltis | |

FOREIGN PATENT DOCUMENTS

| | | |
|---|---|---|
| FR | 2847594 | 5/2004 |
| FR | 2855830 | 12/2004 |
| WO | WO 01/60944 | 8/2001 |
| WO | WO 01/60945 | 8/2001 |
| WO | WO2004/050792 | 6/2004 |

OTHER PUBLICATIONS

Morss. Preparation of Cubic chloro complex compounds of trivalent metals: Cs2NaMCl6. Inorganic Chemistry 7, 1771-1775.*
Kinloch. New Developments in Cadmium Tungstate. IEEE Transactions on nuclear science, vol. 41, No. 4752-754.*
Kanai S. Shah et al., "Planar APD Arrays for High Resolution PET", Abstract: www.rmdinc.com/oldsite/papers/SPIEDENVERapda.pdf.
Gerard Visser et al., "Development of Low Power High Speed Readout Electronics for High Resolution PET With LSO and APD Arrays", www.NOVARD.com/pages/documents/IEEE_Low_Power2001.pdf.
J.C. van't Spijker et al., "Scintillation and Luminescence Properties of $Ce^{3+}$Doped $K_2LaCl_5$", Journal of Luminescence, vol. 85, pp. 1-10, 1999.
E.V.D. van Loef et al., "Influence of the Anion on the Spectroscopy and Scintillation Mechanism in Pure and $Ce^{3+}$-Doped $K_2LaX_5$ and $LaX_3$ (X = Cl, Br, I)", Physical Review, vol. 68, No. 4, pp. 45108-1 to 45108-9, 2003.
E.V.D. van Loef et al., "Scintillation Properties $LaCl_3:Ce^{3+}$Crystals: Fast, Efficient, and High-Energy Resolution Scintillators", IEEE Transactions on Nuclear Science, vol. 48, No. 3, pp. 341-345, Jun. 2001.
E.V.D. van Loef et al., "High-Energy-Resolution Scintillator: $Ce^{3+}$Activated $LaCl_3$", Applied Physics Letters, vol. 77, No. 10, pp. 1467-1468, Sep. 4, 2000.
E.V.D. van Leof et al., "High-Energy-Resolution Scintillator: $Ce^{3+}$Activated $LaBr_3$", Applied Physics Letters, vol. 79, No. 10, pp. 1573-1575, Sep. 3, 2001.
A. V. Gektin, "Scintillators and Storage Phosphors Based on $ABX_3$ Crystals", Journal of Luminescence, vol. 87-89, pp. 1283-1285, 2000.
O. T. Antonyak et al., "Study of Features of Excitation of $Ce^{3+}$Ions in Perovskite Halide Crystals", Optics and Spectroscopy, vol. 84, No. 6, pp. 861-864, 1998.
A. V. Gektin et al., "High-Temperature Thermoluminescence of $KMgF_3$-Based Crystals", Journal of Luminescence, vols. 72-74, pp. 664-666, 1997.

(Continued)

Primary Examiner—C. Melissa Koslow
Assistant Examiner—Matthew E Hoban
(74) Attorney, Agent, or Firm—Scott J. Asmus

(57) ABSTRACT

A method is provided that includes heating a powder to a temperature that is below the melting point of the scintillator composition but is sufficiently high to form a coherent mass. The powder includes a scintillator composition. The coherent mass is polycrystalline and has a pulse height resolution that is less than 20 percent at 662 kilo electron volts; a light yield of more than 5000 photons per milli electron volt; or both a pulse height resolution that is less than 20 percent at 662 kilo electron volts and a light yield of more than 5000 photons per milli electron. A sintered body is provided also.

16 Claims, No Drawings

OTHER PUBLICATIONS

A. S. Voloshinovskii et al., "Peculiarities of Excitation of Ce-Emission in Core Region of Chlorine Perovskites", Radiation Measurements, vol. 29, No. 3-4, pp. 251-255, 1998.
G. Blasse et al., "Luminescent Materials", X-Ray Phosphors and Scintillators (Counting Techniques), Springer-Verlag, Berlin, Heidelberg, New York, London, Paris, Tokyo, Hong Kong, Barcelona, Budapest, pp. 178-194.
J. C. Brice, "Crystal Growth Processes", Blackie Glasgow and London, Halsted Press, a Division of John Wiley and Sons, New York, pp. 104-162.

* cited by examiner

COMPOSITION, ARTICLE, AND METHOD

CROSS REFERENCE TO RELATED APPLICATIONS

This application claims benefit and priority to U.S. provisional application Ser. No. 60/763249, filed Jan. 30, 2006, and to U.S. provisional application Ser. No. 60/882035, filed on Dec. 27, 2006; and this application is a continuation-in-part of U.S. patent application Ser. No. 11/427191, filed Jun. 28, 2006, and a continuation-in-part of U.S. patent application Ser. No. 11/095233, filed on Mar. 30, 2005.

BACKGROUND

1. Technical Field

The invention includes embodiments that relate to the field of radiation detectors. Embodiments may include a scintillator composition for use in a radiation detector. Embodiments may include a method of making and/or using the scintillator composition.

2. Discussion of Related Art

Radiation detectors may detect gamma-rays, X-rays, cosmic rays, and particles characterized by an energy level of greater than about 1 keV. Scintillator crystals may be used in such detectors. In these detectors, a scintillator crystal may be coupled with a light-detector, such as a photodetector. When a photon from a radionuclide source impacts the crystal the crystal may emit light in response. The light detector may detect the light emission. In response, the photodetector may produce an electrical signal. The electrical signal may be proportional to the number of light emissions received, and further may be proportional to the light emission intensity. A scintillator crystal may be used in medical imaging equipment, e.g., a positron emission tomography (PET) device; as a well-logging tool for the oil and gas industry; and in other digital imaging applications.

Medical imaging equipment, such as positron emission tomography (PET), may employ a scintillator crystal detector having a plurality of pixels arranged in a circular array. Each pixel may include a scintillator crystal cell coupled to a photomultiplier tube. In PET, a chemical tracer compound having a desired biological activity or affinity for a particular organ may be labeled with a radioactive isotope. The isotope may decay by emitting a positron. The emitted positron may interact with an electron, and may provide two 511 keV photons (gamma rays). The two photons are emitted simultaneously and travel in almost exactly opposite directions, penetrate the surrounding tissue, exit the patient's body, and are absorbed and recorded by the detector. By measuring the slight difference in arrival times of the two photons at the two points in the detector, the position of the positron emission inside the target can be calculated. Naturally, the positron emission coincides with the position of the isotope, and of the tissue or organ labeled by the isotope. A limitation of this time difference measurement may include the stopping power, light output, and decay time of the scintillator composition.

Another application for a scintillator composition is in a well-logging tool. The detector in this case captures radiation from a geological formation, and converts the captured radiation into a detectable light emission. A photomultiplier tube may detect the emitted light. The light emissions may transform into electrical impulses. The scintillator composition, and associated hardware, must function at high temperature, as well as under harsh shock and vibration conditions. A nuclear imaging device may encounter high temperature and high radiation levels.

It may be desirable to have a scintillator composition and an article employing a scintillator composition that has one or more properties and characteristics that differ from those currently available. It may be desirable to have a method of making and/or using a scintillator composition that may differ from those currently available.

BRIEF DESCRIPTION

In one embodiment, a polycrystalline scintillator composition is provided. The polycrystalline scintillator composition is capable of being sintered to form a body having a pulse height resolution that is less than about 20 percent at 662 kilo electron volts.

In one embodiment, a radiation detector for detecting high-energy radiation is provided. The detector includes the body formed from the scintillator composition, and a photon detector optically coupled to the body and capable of converting photons into electrical signals.

In one embodiment, a method is provided that includes heating a powder that includes a scintillator composition to a temperature that is below the melting point of the scintillator composition but is sufficiently high to form a coherent mass. The coherent mass is polycrystalline and has a pulse height resolution that is less than 20 percent at 662 kilo electron volts; a light yield of more than 5000 photons per million electron volt; or both a pulse height resolution that is less than 20 percent at 662 kilo electron volts and a light yield of more than 5000 photons per million electron.

In one embodiment, a sintered scintillator body is provided that includes an article formed by sintering a powdered composition comprising a cubic halide having more than one cation defining a base host lattice. And, the body has at least one of a pulse height resolution that is less than 20 percent at 662 kilo electron volts, or a light yield of more than 5000 photons per million electron volt.

DETAILED DESCRIPTION

The invention includes embodiments that relate to the field of radiation detectors. Embodiments may include a scintillator composition for use in a radiation detector. Embodiments may include a wafer including the scintillator composition, an article including the wafer, and a method of making and/or using the scintillator composition, the wafer, and/or the article.

As used herein, light output refers to a quantity of light emitted by a scintillator composition after excitation by a pulse of the X-ray or gamma ray. Unless specified otherwise, light refers to visible light. Decay time refers to the time required for the intensity of the light emitted by the scintillator to decrease to a specified fraction of the light intensity after radiation excitation ceases. Afterglow refers to the light intensity emitted by the scintillator at a specified time (e.g., 100 milliseconds) after radiation excitation ceases. Afterglow may be reported as a percentage of the light emitted while the scintillator is excited by the radiation. Stopping power refers to the ability of a material to absorb radiation, and may be referred to as the material's X-ray absorption or X-ray attenuation. Attenuation length refers to a distance inside the material, which a photon has to travel before the energy of the photon is absorbed by the material. Energy resolution refers to a radiation detector ability to distinguish between energy rays (e.g., gamma rays) having similar energy levels.

As used herein, the term "solid solution" refers to a mixture of the halides in solid, crystalline form, which may include a single phase, or multiple phases. A scintillator is a device or substance that absorbs high energy (ionizing) electromagnetic or charged particle radiation and fluoresces photons at a characteristic (longer) wavelength in response. A matrix refers to a host lattice formed from material of the scintillator composition, which has a higher volume fraction relative to other materials present in the scintillator composition. A dopant is a minor fraction of a composition relative to the significant components of the host lattice, and the dopant may be either substituted in the matrix or atomically dispersed in the matrix. A dopant ion is raised to an excited state by absorbing radiation of suitable wavelengths, and returns to the ground state by emitting radiation. Z(effective) or $Z_{eff}$ is the amount of positive charge on the nucleus perceived by an electron.

As used herein, "scintillator composition" may be used interchangeably with "scintillator composition", "ternary scintillator composition", "quaternary scintillator composition", and higher order scintillator compositions. Unless context or language indicates otherwise, alkali halides (such as NaI and CsI) are not included in scintillator composition. In one embodiment, the scintillator composition may refer to cubic halide materials. In one embodiment, scintillator composition may refer to barium floride (BaF$_2$), bismuth germinate (Bi$_4$Ge$_3$O$_{12}$), yttrium aluminum garnet (Ce:YAG), lanthanum bromide (LaBr$_3$), cadmium tungstate (CdWO$_4$), lead tungstate (PbWO$_4$), zinc selenide (ZnSe(Te)), or lutetium iodide (LuI$_3$). In one embodiment, scintillator composition may refer to a crystalline composition having the lattice structure of A$_2$BX$_6$; where A is a metal (e.g., cesium), B is an alkaline metal (e.g., sodium, cerium, or lithium), and X is a halide (e.g., chlorine, fluorine, iodine, or bromine). Thus, the crystalline composition may include, for example, Cs$_2$NaPrCl$_6$, Cs$_2$NaPrCl$_5$Br, Cs$_2$NaCeCl$_5$I, Cs$_2$NaCeCl$_3$I$_3$, Cs$_2$NaCeBr$_5$I, Cs$_2$NaCeBr$_4$I$_2$, or Cs$_2$NaCeBr$_3$I$_3$.

The terms "transparency" and "translucency", as used herein, describe various degrees of optical clarity in the scintillator composition. A transparent scintillator composition may exhibit an optical attenuation coefficient of less than 100 cm$^{-1}$, as measured by standard spectral transmittance tests ("narrow" angle transmission) on a polished scintillator material plate at the luminescent wavelength of the respective ion.

The term "sinter" refers to the process by which a coherent mass is formed without melting. The term "forge" is the process by which a shaped mass is formed with the application of heat and pressure.

Approximating language, as used herein throughout the specification and claims, may be applied to modify any quantitative representation that could permissibly vary without resulting in a change in the basic function to which it is related. Accordingly, a value modified by a term or terms, such as about, may not to be limited to the precise value specified. In at least some instances, the approximating language may correspond to the precision of an instrument for measuring the value. Similarly, free may be used in combination with a term, and may include an insubstantial number, or trace amounts, while still being considered free of the modified term.

In one embodiment, a finely divided solid or powder includes all the reactants needed to form a scintillator composition. Alternatively, some of the reactants can be added into a mold with the powder. The powder can include, for example, a cubic halide material. Suitable average powder sizes can be a diameter of less than about 100 micrometers. In one embodiment, the diameter can be in a range of from about 100 micrometers to about 50 micrometers, from about 50 micrometers to about 10 micrometers, from about 10 micrometers to about 1 micrometer, from 1 micrometer to about 500 nanometers, from about 500 nanometers to about 250 nanometers, from about 250 nanometers to about 100 nanometers, or less than about 100 nanometers. Multi-modal distributions of power sizes may be used to increase packing and/or control grain boundary distribution (post-processing). Dopants and/or additives may be added with the powder, or the powder may be treated to include the dopants and/or additives prior to processing. Alternatively or additionally, the powder may be purified prior to use to remove unwanted contaminants.

Cubic halide materials are inherently structurally symmetric, and may be optically isotropic, that is, they have the same refractive index in all directions. In non-inventive polycrystalline ceramics, scintillated light would refract multiple times as it crossed crystal grain boundaries resulting in long optical paths and concurrent absorption, and the light would impinge on reflective channel walls and be diminished at each impingement to a level insufficient for useful detection by a photodiode. For polycrystalline materials having non-cubic structure, an appreciable amount of light may be scattered and re-absorbed over a relatively longer effective light path length, thereby decreasing the amount of light available for detection by external photo-sensors. As used herein, matrix and host lattice may be interchanged unless context or language indicates otherwise.

A scintillator composition according to an embodiment of the invention may be formed from a plurality of reactants. In one embodiment, the reactants can include a matrix, a dopant, and at least one halide ion. The scintillator composition may further include a dopant. In one embodiment, the dopant may include a cerium dopant ion disposed in the matrix, and a bismuth dopant ion disposed in the matrix.

In one embodiment, a polycrystalline scintillator composition is provided that is capable of being sintered to a body having a pulse height resolution that is less than 20 percent at 662 kilo electron volts. In one embodiment, the scintillator composition further may include a matrix having at least one halide ion and a dopant, the dopant including a cerium dopant ion disposed in the matrix. The matrix further may include an alkaline ion. Suitable alkaline ions may include cesium, lithium, potassium, rubidium, and sodium. In one embodiment, the scintillator composition further may include a matrix having at least one halide ion and a dopant, the dopant including a praseodymium ion that is disposed in the matrix. In one embodiment, the matrix further includes an alkaline ion. Suitable alkaline ions may include cesium, lithium, potassium, rubidium, and sodium. The scintillator composition further may include a matrix having at least one halide ion and a dopant, the dopant including a bismuth dopant ion disposed in the matrix. The matrix further includes an alkaline ion. Suitable alkaline ion may include cesium, lithium, potassium, rubidium, and sodium. In one embodiment, a lanthanide ion may be part of the matrix or be a dopant. Suitable lanthanide ion may include one or more material selected from the group consisting of erbium, europium, gadolinium, lanthanum, lutetium, terbium, yttrium, and ytterbium. The halide ion may include iodine, fluorine, chlorine, bromine, or a combination of two or more thereof. In one embodiment, in attenuation length of the polycrystalline scintillator composition is about $Z_{eff}$ factor in a range of from about 40 to about 55.

The scintillator composition may include lutetium as the lanthanide ion. The lanthanide ion may include less than about 70 mole percent. In one embodiment, the lanthanide ion may include lutetium in an amount in a range of from about from about 50 mole percent to about 70 mole percent, from about 70 mole percent to about 90 mole percent, from about 90 mole percent to about 100 mole percent. In one embodiment, the lanthanide ion may consist essentially of lutetium.

In one embodiment, the scintillator composition may include an amount of lutetium in combination with one or more other lanthanide ions. Other suitable lanthanide ions may include one or more of erbium, europium, gadolinium, lanthanum, praseodymium, scandium, terbium, ytterbium, yttrium, or combinations of two or more thereof. In one embodiment, the scintillator composition may include an amount of cesium in combination with another alkali metal (at a ratio of 2:1 cesium:alkali metal). In addition to cesium, praseodymium and/or cerium may be present as part of the matrix, as a dopant, or as both part of the matrix and as a dopant.

The reaction product of the reactants according to an embodiment of the invention may be a sintered body having a pulse height resolution that is less than 20 percent at 662 kilo electron volts, a light yield of more than 5000 photons per million electron volt, or having both a pulse height resolution that is less than 20 percent at 662 kilo electron volts and a light yield of more than 5000 photons per million electron volt. In one embodiment, the reaction product may have a double perovskite structure. In one embodiment, the reaction product may have an elpasolite structure. In one embodiment, the reaction product may have a tetragonal structure (e.g., $Cs_2NaCeBr_3I_3$). In one embodiment, the reaction product may have a lattice structure that is the same, or about the same, as $K_2PtCl_6$. In one embodiment, the reaction product includes at least one material selected from $Cs_2NaPrCl_6$, $Cs_2NaPrCl_5Br$, $Cs_2NaCeCl_5I$, $Cs_2NaCeCl_3I_3$, $Cs_2NaCeBr_5I$, $Cs_2NaCeBr_4I_2$, or $Cs_2NaCeBr_3I_3$.

A dopant ion may produce luminescence by absorption of the electrons and release of the excitation energy as photons of particular wavelengths. In some instances, the dopant ion may be an activator ion. The dopant ion luminescence may, in turn, activate a scintillator ion and cause the scintillator ion to emit light. Hence, it may be sometimes desirable to have a combination of dopant ion and scintillator ion, which are mutually amicable. For example, a dopant ion such as bismuth may facilitate transport of energy from the charge carriers to the scintillator ion.

The total amount of the dopant present in the scintillator composition may be selected based on particular factors. Such factors may include, for example, the particular matrix being used; the desired emission properties and decay time; and the type of detection device into which the scintillator composition is being incorporated.

Suitable additives may include rare earth dopants. Suitable rare earth dopants may be in the form of oxides, oxalates, carbonates, or nitrates. Other suitable dopants may include europium and/or samarium to reduce afterglow. In one embodiment, the powder is purified to remove uranium, thorium and radioactive isotopes of potassium.

A suitable halide ion may include one or more of bromine, chlorine, fluorine, or iodine. Iodine may be present in an amount in a range of greater than about 95 mole percent. In one embodiment, the scintillator composition may include iodine in an amount in a range of from about 80 mole percent to about 85 mole percent, from about 85 mole percent to about 95 mole percent, or from about 95 mole percent to about 100 mole percent.

In one embodiment, the halide ion may include iodine and may be in combination with one or more of fluorine, chlorine, or bromine. The fluorine, chlorine, or bromine may be present in an amount in a range of greater than about 50 mole percent of the total amount of the halide ion present in the scintillator composition. In one embodiment, the amount may be in a range of from about 5 mole percent to about 15 mole percent, from about 15 mole percent to about 25 mole percent, from about 25 mole percent to about 50 mole percent, or more than about 50 mole percent of the total amount of the halide ion present in the scintillator composition. Where two or more different halides are present in the reaction product, the ratio of the lowest atomic weight halide to a higher atomic weight halide may be 5:1, 1:1 or 2:1 in various embodiments.

The matrix material may include a plurality of reactants. In one embodiment, the reactants can be a mixture of lanthanide and/or alkaline metal, dopants, and halide ions. A plurality of differing lanthanide halides may be used for the scintillator composition. The mixture may include lutetium iodide. In one embodiment, lanthanide chlorides, lanthanide fluorides, or lanthanide bromides may also be used in combination with lutetium iodides. In one embodiment, the mixture may consist essentially of lutetium iodide. In addition to lutetium iodide, the mixture may also include gadolinium chloride, yttrium chloride, or both. Other non-limiting examples of suitable lanthanide halides include lutetium chloride, lutetium bromide, yttrium chloride, yttrium bromide, gadolinium chloride, gadolinium bromide, praseodymium chloride, praseodymium bromide, and mixtures of two or more thereof. A combination of lutetium chloride and lutetium bromide may be used as a matrix material. The ratio of the lutetium chloride and lutetium bromide may be a molar ratio in the range of about 1:99 to about 99:1. As specific examples of useful ratios for this combination, the molar ratio of lutetium chloride to lutetium bromide may be in a range of from about 10:90 to about 90:10, from about 15:85 to about 30:70, from about 30:70 to about 50:50, from about 50:50 to about 70:30, from about 85:15 about 90:10, and less than about 90:10. Other combinations may have the same molar ratio as disclosed for lutetium chloride and lutetium bromide.

The specific ratio of the selected reactants may be based on desired properties of the scintillator composition. Such properties may include, for example, light output and energy resolution (e.g., light yield), rise time, decay time, stopping power, or combinations of two or more thereof. A scintillator composition having a high stopping power may allow little or no incident radiation, such as gamma radiation, to pass through. The stopping power may be directly related to the density of the scintillator composition. In one embodiment, the scintillator composition may have a high density, which may be near a theoretical maximum density. Higher light output may lower an amount of incident radiation required for the desired end use. Thus, in applications such as PET the patient may be exposed to a relatively lower dose of radioactive material. Shorter decay time may reduce the scan time resulting in more efficient use of the PET system and better observation of the motion of a body organ. Higher stopping power may reduce the quantity of scintillator composition needed for the end use. Thinner detectors have a reduced quantity of material and a lower cost of manufacture. A thinner detector may reduce the absorption of emitted light.

The reaction product of the mixture of halides may result in a scintillator composition with a relatively increased light output response. In one embodiment, the light output of the scintillator composition may be in a range of from about 4500 photons per million electron volt to about 10000 photons per million electron volt, from about 10000 photons per million electron volt to about 50000 photons per million electron volt, from about 50000 photons per million electron volt to about 100000 photons per million electron volt, or greater than about 100000 photons per million electron volt. In one embodiment, the light output may be about 5000 photons per million electron volt.

As discussed above, the scintillator composition may include a dopant. Suitable dopants may include, for example, a cerium dopant ion and a bismuth dopant ion. The selection of the dopant and the amount of the dopant present in the scintillator composition may depend on various factors, such as the particular matrix being used, the desired emission properties and decay time, after glow, and/or the type of detection device into which the scintillator is being incorporated. As decay time of the cerium ion may be in the nanoseconds range, and since the bismuth ions may facilitate transport of the excitation energy of the scintillator ions, such a scintillator composition may have a decay time in the nanoseconds range.

In one embodiment, the amount of the dopant in the scintillator composition may be in a range of from about 0.1 mole percent to about 1 mole percent, from about 1 mole percent to about 5 mole percent, from about 5 mole percent to about 10 mole percent, from about 10 mole percent to about 15 mole percent, from about 15 mole percent to about 20 mole percent, or greater than about 20 mole percent, based on the total moles of the dopant in the matrix. The gradient change can be greater than 1 percent change per 1 percent of the distance. Alternatively, the change can be made in stepwise advances.

The cerium dopant ion may be present in an amount in a range of from about 0.1 percent to about 0.5 percent, 0.5 percent to about 2 percent, from about 2 percent to about 5 percent, from about 5 percent to about 8 percent, from about 8 percent to about 10 percent, or more than about 10 percent, based on the total percent of the dopant. The bismuth dopant may be present in the dopant ion in an amount in a range of from 0.1 percent to about 0.5 percent, 0.5 percent to about 2 percent, from about 2 percent to about 5 percent, from about 5 percent to about 8 percent, from about 8 percent to about 10 percent, based on the total percent of the dopant. The relative amounts of the two dopant ions may be employed based upon the desired properties, such as stopping power, of the resulting scintillator composition. The stopping power of the scintillator composition may be measured in terms of the Z(effective). For example, the Z(effective) of lutetium iodide may be 61, while that of $Lu_{0.80}Bi_{0.20}I_3$ may be 63.

The cerium and bismuth co-doped scintillator composition may exhibit higher energy resolution as compared to only cerium or only bismuth doped scintillator composition. As mentioned, the bismuth ion may facilitate transport of the excitation energy of the cerium ion to the matrix material.

In one embodiment, the energy resolution of the scintillator composition may be less than about 2.5 percent. In another embodiment, the energy resolution of the scintillator composition may be in a range of from about 2.5 percent to about 5 percent, from about 5 percent to about 6 percent, or from about 6 percent to about 7 percent, or greater than about 7 percent.

The scintillator composition may be in polycrystalline form, or may exist as a solid solution. The polycrystalline form may be made of plurality of crystallites or grains, which may be separated by grain boundaries. The crystallite size of the polycrystalline form may be less than about 20 micrometers. In one embodiment, the average distance from one grain boundary to another grain boundary is in a range of from about 20 micrometers to about 10 micrometers, from about 10 micrometers to about 1 micrometer, from about 1 micrometer to about 500 nanometers, from about 500 nanometers to about 100 nanometers, or less than about 100 nanometers.

The density of the scintillator composition employed in the scintillation element may be in a range of greater that about 6 grams per cubic centimeter. In one embodiment, the density of the scintillator composition may be in a range of from about 4.5 grams per centimeter cube to about 5 grams per centimeter cube, or from about 5 grams per centimeter cube to about 6 grams per centimeter cube.

The halide reactants may be supplied in powder form. In one embodiment, the scintillator composition is prepared as a powder form by using the dry process. The process may include the steps of preparing a suitable powder mixture containing the ingredients in determined proportions. In another embodiment, and depending on compatibility and/or solubility, heptane, or an alcohol may be used as a liquid vehicle during milling. Suitable alcohols may include ethyl alcohol, methanol, propanol, and the like. Milling media may be selected to reduce contamination in the scintillator composition. Non-contaminating milling media may be used to maintain high light output capability of the scintillator composition.

Using an agate mortar and pestle may carry out mixing of the reactants. Alternatively, a blender or pulverization apparatus may be used, such as a ball mill, a bowl mill, a hammer mill, or a jet mill.

In one embodiment, the powder is formed into powder compacts (green bodies) by pressing (e.g., die pressing, isostatic pressing, vacuum hot-pressing). This may increase green density. In alternative embodiments, the green body may be pre-processed by one or both of induction sintering or microwave sintering. Pre-pressing may be used to form a green body prior to an isostatic pressing or hot pressing. In one embodiment, the green body is pressed to a relative density of up to about 55% of the theoretical density. In the pre-pressing step, a die material that is inert with respect to the scintillator constituents under the processing conditions may be used to avoid undesired reactions and contaminations. Suitable die materials include alumina, silicon carbide, and metals such as molybdenum, hardened steel, or nickel-based alloys. Suitable processing pressures in-die can be in a range of from about 21 mPa (3,000 psi) to about 103 mPa (15,000 psi) for a time that can be less than one hour. A green body or the powder itself may be pre-sintered at a temperature sufficient to promote grain growth of the scintillator material to a substantially closed pore stage, for a density of >95% of the theoretical density, prior to any of the sintering, hot pressing or isostatic-pressing. The green body can be sintered (e.g., hot pressed or hot isostatically pressed in piston-cylinder or belt-apparatuses including anvil or multi-anvil (Walker Module) types). As used herein, "hot" is greater than about 300 degrees Celsius. A suitable forging device uses at least one die and the scintillator element takes the inverse shape of the die.

The size of the die can be based of the desired size of the scintillator element and the end use applications. Dies in the form of long body can be small (e.g., 2 cm×2 cm) or can be large (e.g., 100 cm×100 cm). The dies can form flat plates or can form more complex shapes, such as curved surfaces. The curve may be along one axis, such as would form a single out-of-plane bow, or may be along two or more axes, such as would form a bowl or rugate form.

The powder (direct formation) or the green body is fired under temperature, pressure, and time conditions sufficient to convert the mixture into an article. These conditions will depend in part on the specific type of material, the shape and thickness, and other factors. Firing may be carried out in a muffle furnace, at a temperature in the range of from about 300 degrees Celsius to about 500 degrees Celsius, about 500 degrees Celsius to about 600 degrees Celsius, from about 600 degrees Celsius to about 700 degrees Celsius, from about 700 degrees to about 800 degrees Celsius, from about 800 degrees Celsius to about 900 degrees Celsius, and greater than about 900 degrees Celsius. The firing time may be in a range of from about 15 minutes to about 1 hour, from about 1 hour to about 2 hours, from about 2 hours to about 4 hours, from about 4 hours to about 5 hours, from about 5 hours to about to about 7 hours, from about 7 hours to about 10 hours, or more than about 10 hours.

In one embodiment, the firing temperatures of 300 degrees Celsius to 1000 degrees Celsius may be chosen such that the scintillator composition is a solid solution. A solid solution or a polycrystalline form may produce a scintillation element having uniform composition, a desirable refractive index, uniformity of the refractive index throughout the scintillation element, and relatively higher light output.

As disclosed above, the compacted shape may be annealed to equilibrate the dopant ions to a determined valence state to increase light yield and to decrease absorption. Cerium or praseodymium may be the dopant, and the annealing atmosphere and temperature may be maintained so as to equilibrate the dopant to a 3+ valence state. Cerium in the 3+ valence state acts as a dopant ion producing light in the presence of suitable wavelengths of radiation.

In one embodiment, the forged wafer size of the polycrystalline scintillator composition may be in a range of from about 1 centimeter×1 centimeter to about 30 centimeters×30 centimeters, from about 30 centimeters×30 centimeters to about 70 centimeters×70 centimeters, or from about 70 centimeters×70 centimeters to about 100 centimeters×100 centimeters, or greater than about 100 centimeters×100 centimeters. The height, width and length of the material do not need to be the same.

The scintillation element formed after processing the polycrystalline wafer may be polished after forging into desired shapes, such as rods, cubes, cuboids, trapezoids, cones, or other geometric shapes. Further, forging may allow for the net-shape fabrication of light piping structures, such as rods or fibers that find applications in long-distance fiber optics. The scintillation element may be coated with a reflector material to form a detector element. In one embodiment, the reflector material may include a halogenated polyolefin, such as polytetrafluoroethylene. For example, the reflector material may be applied on individual scintillation elements in an array of scintillation elements to reduce cross talk of light between the elements. Further, a coated array of scintillation elements may be then employed in a radiation detector system.

Firing may be carried out in an oxygen-free and water-free (or moisture-free) atmosphere. Examples of oxygen-free environments may include a mixture an inert gases. Inert gases may include one or more of nitrogen, helium, neon, argon, krypton, and xenon.

The scintillator composition may be formed into a wafer by forming a large boule or ingot and cutting or dicing, or by pressing or sintering at a reflow temperature to form the final shape. In one embodiment, the wafer may be a continuous film or sheet. In another embodiment, the wafer may be a non-continuous film or sheet. The non-continuous wafer may have several sub-portions that are separate, insulated, or spaced from each other. For example, the non-continuous wafer may be a combination of several pixels or pixel elements. The pixels may be formed by partially masking the substrate during deposition of the wafer. In application such as PET, the pixels may be equi-sized. Each of the pixels of the non-continuous wafer may form an individual detector element. In case of the continuous wafer, the wafer may be cut or divided into a plurality of pixels to form an array of detector elements. The pixels of the continuous or non-continuous wafer may be coated with the reflector material to form the detector element. For example, the reflector material may be applied on the individual pixels in an array of the pixels. Further, the coated array of the pixels may be then employed in a radiation detector system.

The wafer may be supported by a substrate. Alternatively, the wafer may be formed as an independent and free-standing layer. In one embodiment, the wafer may have uniform thickness. In another embodiment, the wafer may have a thickness that differs in one area relative to another area. The wafer may have an average thickness of less than about 5 millimeters. In one embodiment, the wafer may have an average thickness in a range of from about 5 millimeters to about 7.5 millimeters, from about 7.5 millimeters to about 1 centimeter, from about 1 centimeter to about 2 centimeters, from about 2 centimeters to about 3 centimeters, or more than about 3 centimeters. The thickness of the wafer may be selected based on the desired energy response with regard to the stopping power of the scintillator composition. In one embodiment, the wafer may have a flat surface. In another embodiment, the wafer may have a bowed, curved or de-shaped surface.

The scintillator composition in its end form may be useful for high-energy radiation detectors, e.g., those used for gamma rays. In one embodiment, the scintillator composition can detect special nuclear materials, suspicious nuclear materials, medical isotopes, naturally occurring radioactive materials, and industrial isotopes. Special nuclear materials may include $^{233}U$, $^{235}U$, $^{237}Np$, Pu. Suspicious nuclear materials may include radionuclides associated with $^{232}U$, $^{238}U$, and $^{241}Am$. Medical isotopes may include $^{67}Ga$, $^{51}Cr$, $^{75}Se$, $^{99m}Tc$, $^{103}Pd$, $^{111}In$, $^{123}I$, $^{125}I$, $^{131}I$, $^{201}Tl$, $^{133}Xe$. Naturally occurring radioactive materials $^{40}K$, $^{226}Ra$, $^{232}Th$ (+daughters), $^{238}U$ (+daughters). Industrial isotopes may include $^{57}Co$, $^{60}Co$, $^{133}Ba$, $^{137}Cs$, $^{192}Ir$, $^{204}Tl$, $^{226}Ra$, $^{241}Am$.

The scintillator composition may have a different optical transparency in the emission region as compared to single crystal scintillators. The transparency may allow the emission radiation to escape efficiently. Also, the absence of scattering centers, such as grain boundaries, may result in relatively higher light outputs. The scintillator composition may be useful in imaging systems, such as PET, where the amount of radiation incident on the scintillator composition may be relatively low.

The scintillator composition may be employed in applications such as positron emission tomography (PET), which is a medical imaging technique in which a radioactive substance is administered to a patient and then traced within the patient's body by an instrument that detects the decay of the radioactive isotope. In PET, a chemical tracer compound having a desired biological activity or affinity for a particular organ is labeled with a radioactive isotope that decays by emitting a positron. The emitted positron loses most of its kinetic energy after traveling only a few millimeters in a living tissue. The positron is susceptible to interaction with an electron, an event that annihilates both particles. The mass of the two particles (positron+electron) is converted into 1.02 million electron volts (1.02 MeV) of energy, divided equally between two 511 keV photons (gamma rays). The two photons are emitted simultaneously and travel in almost exactly opposite directions. The two photons penetrate the surrounding tissue, exit the patient's body, and are absorbed and recorded by photo detectors arranged in a circular array. Tracing the source of the radiation emitted from the patient's body to the photo detectors can assess biological activity within an organ under investigation.

The economic value of PET as a clinical imaging technique may relate to the performance of the photo detectors. Each photodetector includes a scintillator cell or pixel. The scintillator cell or pixel may couple to one or more photomultiplier tubes. The scintillator cell produces light at the two points where the 511 KeV photons impact the scintillator cells. The light produced by the two scintillator cells is sensed by the corresponding coupled photomultiplier tubes. Approximate simultaneous interaction of the photons on the scintillator cells indicate the presence of a positron annihilation along the line joining the two points of interaction. The photomultiplier tubes generate an electrical signal in response to the produced light. By measuring the slight difference in arrival times (time of flight) of the two photons at the two points in scintillator cell, the position of positron can be calculated. The electrical signals from the photomultiplier tubes are processed to produce an image of the patient's organ.

In the case of living targets such as human beings or animals, a minimal amount of the radioactive substance is administered inside the target in order to reduce adverse affects of the radioactive isotope. The minimal amount may be sufficient to produce a detectable amount of lesser energy photons. However, lesser energy photons may require a scintillator composition with sufficiently high sensitivity, density, and luminous efficiency. Also, a short decay time may reduce the integration time during the determination of the intensity of the input radiation, so that the image rate for the generation of images and/or projections can increase. As a result, the occurrence of artifacts, such as shadow image, may be reduced. Moreover, examination time may be reduced for the patient because more single images can be measured within a shorter period of time. Also, it may be sometimes desirable to Stopping power relates to the density of the scintillator composition. Scintillator compositions which have high stopping power allow little or no radiation to pass through, and this is a distinct advantage in efficiently capturing the radiation.

A shorter decay time may facilitate efficient coincidence-counting of gamma rays. Consequently, a shorter decay time may reduce scan times. Reduced afterglow may sharpen the image at the scintillator cell. In one embodiment, the reduced afterglow may be free from image artifacts (ghost images). As disclosed above, stopping power relates to the density of the scintillator composition. In one embodiment, the scintillator composition has a stopping power that allows little or no radiation to pass through, and may efficiently capture the incident radiation.

A timing resolution on the order of 4 nanoseconds constrains the positron to a 50 cm region. As 50 cm is about the size of an average human body, a timing resolution on the order of 4 provides little information regarding the location of an annihilation point in the body. A timing resolution of about 0.5 nanoseconds constrains the positron to about a 5 centimeter square region. Embodiments of detector elements including the disclosed scintillator composition have a relatively fast rise time, fast decay time, and high light output. The rise time may be less than about 4 nanoseconds. In one embodiment, the rise time may be in a range of from about $10^{-11}$ seconds to about $10^{-10}$ seconds, from about $10^{-10}$ seconds to about $10^{-9}$ seconds, from about $10^{-9}$ seconds to about $10^{-8}$ seconds, or less than about $10^{-11}$ seconds. In one embodiment, a rise time of the polycrystalline scintillator composition is less about 600 picoseconds, or is less about 300 picoseconds The decay time of a detector element including a scintillator composition may be less than about 50 nanoseconds. In one embodiment, the decay time may be in a range of from about 20 nanoseconds to about 30 nanoseconds, from about 30 nanoseconds to about 40 nanoseconds, or from about 40 nanoseconds to about 50 nanoseconds. The density of a detector element including a scintillator composition allow reduced thickness of the wafer of the scintillator composition. The reduced thickness may allow for reduced scattering of the photons in the detector element including the scintillator composition.

The scintillator composition may be employed in a time-of-flight (TOF) radiation detector. An exemplary measure of the efficacy of the TOF detector is the number density of photons per unit time. TOF refers to the transit of the photons from their source in the body to the PET scanner's scintillator ring. In a TOF detector, the detection of a photon by a detector of the detector ring or the scintillator ring results in the opening of an electronic time window, during which detection of a photon at the other detector of the detector ring results in the counting of a coincidence event. Not only are the photons detected inside the time window, but also the difference in time-of-flight between the two photons is measured and used to estimate a more probable location of the annihilation point along the line. This may reduce the signal to noise ratio and may boost the image quality. Measuring the slight difference in the arrival times of two photons emitted from the same positron with sufficiently good timing resolution may determine where along the line the positron was originally located within the target.

Although, the scintillator composition is described with respect to a PET imaging system, the scintillator composition may be used in other applications that benefit from similar properties. For example, the scintillator composition may be a down-hole detector or well-logging tool.

The well-logging tool may include a radiation detector assembly. The radiation assembly may be placed in or coupled to a tool housing that is a drill or bore assembly. The radiation detector assembly employs a scintillator composition and a light-sensing device (e.g., photomultiplier tube) optically coupled together by an optical interface. The light-sensing device converts the light photons emitted from the scintillator composition into electrical pulses that are shaped and digitized by associated electronics. The detector assembly captures radiation from the surrounding geological formation. The radiation may be converted into light. The generated light transmits to the light-sensing device. The light impulses transform into electrical impulses. The scintillator composition, the light-sensing device, and the optical interface may be sealed inside a detector housing. The optical interface includes a window coupled to the detector housing. The window facilitates radiation-induced scintillation light to pass out of the detector housing for measurement by the light-sensing device. The optical window may be made of a material that is transmissive to scintillation light given off by the scintillator composition. The detector casing may be made of metal, such as stainless steel, or aluminum. A detector cable connects the detector assembly to a power source and data processing circuitry. Data based on the impulses from the photomultiplier tube may be transmitted "up-hole" to analyzing equipment and the data processing circuitry. Alternatively, the data may be stored locally downhole. The data processing unit electrically couples to an operator workstation. The operator workstation couples to an output device.

Sometimes the data may be obtained and transmitted while drilling, i.e., "measurements while drilling" (MWD). The scintillation element in the well-logging tool can function at high temperatures and under harsh shock and vibration conditions. The scintillator composition may have one or more properties discussed previously, e.g., high light output and energy resolution, as well as fast decay time. The scintillator composition fits in package suitable for a constrained space. The threshold of the acceptable properties has been raised considerably as drilling is undertaken at much greater depths.

In another embodiment, the apparatus can be configured for use as a nuclear imaging device.

Reference is made to substances, components, or ingredients in existence at the time just before first contacted, formed in situ, blended, or mixed with one or more other substances, components, or ingredients in accordance with the present disclosure. A substance, component or ingredient identified as a reaction product, resulting mixture, or the like may gain an identity, property, or character through a chemical reaction or transformation during the course of contacting, in situ formation, blending, or mixing operation if conducted in accordance with this disclosure with the application of common sense and the ordinary skill of one in the relevant art (e.g., chemist). The transformation of chemical reactants or starting materials to chemical products or final materials is a continually evolving process, independent of the speed at which it occurs. Accordingly, as such a transformative process is in progress there may be a mix of starting and final materials, as well as intermediate species that may be, depending on their kinetic lifetime, easy or difficult to detect with current analytical techniques known to those of ordinary skill in the art.

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these other subsequent changes, transformations, or reactions the reactants, ingredients, or the components to be brought together may identify or indicate the reaction product or final material.

The foregoing examples are merely illustrative of some of the features of the invention. The appended claims are intended to claim the invention as broadly as it may have been conceived and the examples herein presented are illustrative of selected embodiments from a manifold of all possible embodiments. Accordingly it is Applicants' intention that the appended claims are not to be limited by the choice of examples utilized to illustrate features of the invention. Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A method, comprising:
   heating a powder comprising a scintillator composition to a temperature that is below the melting point of the scintillator composition but is sufficiently high to form a coherent mass, wherein the coherent mass is polycrystalline and has:
   a pulse height resolution that is less than 20 percent at 662 kilo electron volts;
   a light yield of more than 5000 photons per million electron volt; or both
   a pulse height resolution that is less than 20 percent at 662 kilo electron volts and a light yield of more than 5000 photons per million electron, and wherein the polycrystalline coherent mass comprises at least one material selected from the group consisting of $Cs_2NaPrCl_6$, $Cs_2NaPrCl_5Br$, $Cs_2NaCeCl_5I$, $Cs_2NaCeCl_3I_3$, $Cs_2NaCeBr_5I$, $Cs_2NaCeBr_4I_2$, and $Cs_2NaCeBr_3I_3$.

2. The method as defined in claim 1, further comprising selecting the powder, wherein the powder is a finely divided solid having an average particle size of less than 2000 micrometers.

3. The method as defined in claim 2, wherein the powder has an average particle size of less than 200 micrometers.

4. The method as defined in claim 1, wherein the scintillator composition comprises a cubic halide.

5. The method as defined in claim 4, wherein the cubic halide has a host lattice comprising at least thee chemical species as significant components of the host lattice.

6. The method as defined in claim 1, further comprising adding a dopant or additive to the powder prior to heating.

7. The method as defined in claim 1, further comprising forging the scintillator composition.

8. The method as defined in claim 1, wherein heating the powder forms a green body, and further comprising forging the green body.

9. The method as defined in claim 1, wherein heating is to a temperature that is less than about 90 percent of the melting point of the scintillator composition.

10. The method as defined in claim 9, wherein heating is to a temperature that is sufficient to consolidate a body from the powder, and the body is the coherent mass, the temperature is sufficient to chemically react ingredients of the powder to form the scintillator composition.

11. The method as defined in claim 1, further comprising disposing the powder in a die such that one or more characteristic of the powder differs in one portion of the die relative to the characteristic of the powder in another portion of the die.

12. The method as defined in claim 11, wherein the characteristic is one or more of particle size, particle shape, dopant type, dopant amount, additive type, additive amount, density, or particle size distribution.

13. The method as defined in claim 1, wherein the heating is at a pressure that is up to about 1379 mPa.

14. The method as defined in claim 13, wherein the pressure is achieved by uniaxial pressing.

15. The method as defined in claim 13, wherein the pressure is achieved by isostatic pressing.

16. The method as defined in claim 1, wherein the heating is for a time that is up to about 120 minutes.

* * * * *

UNITED STATES PATENT AND TRADEMARK OFFICE
CERTIFICATE OF CORRECTION

PATENT NO. : 7,700,003 B2
APPLICATION NO. : 11/668900
DATED : April 20, 2010
INVENTOR(S) : Martins Loureiro et al.

Page 1 of 1

It is certified that error appears in the above-identified patent and that said Letters Patent is hereby corrected as shown below:

On the title page, item (56), under "OTHER PUBLICATIONS", in Column 1, Lines 1-2, delete "Ce3+- doped YAlO3 and Lux(RE)l-xAlO3(RE=Y3+and Gd3+)," and insert -- $Ce^{3+}$- doped $YAlO_3$ and $Lu_x(RE)_{1-x}AlO_3(RE=Y^{3+}$ and $Gd^{3+})$, --, therefor.

On the title page, item (56), under "OTHER PUBLICATIONS", in Column 2, Line 2, delete "Cs2NaMCI6." and insert -- $Cs_2NaMCl_6$. --, therefor.

On the title page, item (57), under "ABSTRACT", in Column 2, Line 7, delete "milli" and insert -- million --, therefor.

On the title page, item (57), under "ABSTRACT", in Column 2, Line 10, delete "milli" and insert -- million --, therefor.

In Column 3, Line 23, delete "floride" and insert -- fluoride --, therefor.

In Column 10, Line 10, in Claim 24, delete "23," and insert -- 22, --, therefor.

In Column 14, Line 24, in Claim 5, delete "thee" and insert -- three --, therefor.

Signed and Sealed this

Seventeenth Day of August, 2010

David J. Kappos
*Director of the United States Patent and Trademark Office*